United States Patent
Waldbauer et al.

(10) Patent No.: US 8,862,327 B2
(45) Date of Patent: Oct. 14, 2014

(54) PROCESS AND DEVICE FOR STABILIZING A VEHICLE

(75) Inventors: Dirk Waldbauer, Eschborn (DE); Thomas Alban, Rochester, MI (US); Jürgen Kröber, Winningen (DE)

(73) Assignee: Continental Teves AG & Co., oHG (DE)

( * ) Notice: Subject to any disclaimer, the term of this patent is extended or adjusted under 35 U.S.C. 154(b) by 2107 days.

(21) Appl. No.: 11/630,735

(22) PCT Filed: Jun. 24, 2005

(86) PCT No.: PCT/EP2005/052973
§ 371 (c)(1),
(2), (4) Date: Jan. 21, 2009

(87) PCT Pub. No.: WO2006/000578
PCT Pub. Date: Jan. 5, 2006

(65) Prior Publication Data
US 2009/0210112 A1 Aug. 20, 2009

(30) Foreign Application Priority Data
Jun. 25, 2004 (DE) .......................... 10 2004 030 922

(51) Int. Cl.
| | | |
|---|---|---|
| A01B 69/00 | (2006.01) |
| B62D 6/00 | (2006.01) |
| B62D 11/00 | (2006.01) |
| B62D 12/00 | (2006.01) |
| B63H 25/04 | (2006.01) |
| B63G 8/20 | (2006.01) |
| G05D 1/00 | (2006.01) |
| G06F 7/00 | (2006.01) |
| G06F 17/00 | (2006.01) |
| G06F 19/00 | (2011.01) |
| B60T 8/1755 | (2006.01) |
| B60T 8/17 | (2006.01) |

(52) U.S. Cl.
CPC .......... *B60T 8/1755* (2013.01); *B60T 2230/06* (2013.01); *B60T 8/1708* (2013.01)
USPC .............................................. 701/42; 701/41

(58) Field of Classification Search
USPC .............................................. 701/42, 25, 41
See application file for complete search history.

(56) References Cited

U.S. PATENT DOCUMENTS 4,878,557 A * 11/1989 Shibahata et al. ............ 180/415
4,951,199 A * 8/1990 Whitehead ...................... 701/41
(Continued)

FOREIGN PATENT DOCUMENTS

DE 195 15 060 A1 5/1996
DE 199 64 048 A1 1/2001
(Continued)

*Primary Examiner* — Jason Holloway
*Assistant Examiner* — Nicholas Kiswanto
(74) *Attorney, Agent, or Firm* — RatnerPrestia

(57) ABSTRACT

A method for stabilizing a vehicle including a trailer drawn by the vehicle including the steps of: determining the yaw rate of the vehicle; determining the reference yaw rate in a vehicle model; producing a difference value from the yaw rate and the reference yaw rate; weighting the difference value with a signal describing the steering dynamics; producing a signal to determine the side of intervention and/or the wheel of intervention and/or the steering angle direction of the vehicle from the tendency to change of the weighted difference value, and applying a counteracting moment depending on the amplitude and the tendency to change of the weighted difference value.

9 Claims, 6 Drawing Sheets

(56) References Cited

U.S. PATENT DOCUMENTS

| | | | | |
|---|---|---|---|---|
| 5,207,483 A | * | 5/1993 | Shimada et al. | 303/148 |
| 5,265,019 A | * | 11/1993 | Harara et al. | 701/41 |
| 5,348,111 A | * | 9/1994 | Williams et al. | 180/415 |
| 5,576,957 A | * | 11/1996 | Asanuma et al. | 701/42 |
| 5,747,683 A | * | 5/1998 | Gerum et al. | 73/117.01 |
| 5,862,503 A | * | 1/1999 | Eckert et al. | 701/78 |
| 6,263,270 B1 | * | 7/2001 | Sato et al. | 701/41 |
| 7,349,776 B2 | * | 3/2008 | Spillane et al. | 701/36 |

FOREIGN PATENT DOCUMENTS

| | | |
|---|---|---|
| DE | 100 32 230 A1 | 1/2002 |
| DE | 100 48 418 A1 | 4/2002 |
| EP | 07 65 787 A2 | 4/1997 |
| EP | 09 89 049 A2 | 3/2000 |
| WO | WO96/16846 | 6/1996 |
| WO | WO2004/041612 A1 | 5/2004 |
| WO | WO2004/041614 A1 | 5/2004 |

* cited by examiner

PROCESS AND DEVICE FOR STABILIZING A VEHICLE

This application is the U.S. national phase application of PCT International No. PCT/EP2005/052973, filed Jun. 24, 2005, which claims priority to German Patent Application No. DE102004030922.1, filed Jun. 25, 2004.

BACKGROUND OF THE INVENTION

1. Technical Field

The present invention relates to a method and a device for stabilizing a vehicle including a trailer drawn by the towing vehicle, wherein the vehicle is monitored in terms of snaking motions, and upon detection of an unstable snaking motion, a moment essentially damping the snaking motion is applied to the vehicle.

2. Description of Related Art

A vehicle of this type including a trailer (car-trailer combination) inheres the risk that quick steering movements, side wind or road irregularities can induce oscillations and cause rolling of the vehicle. Depending on the driving speed, the oscillations can decay, remain constant, or increase (undamped oscillation). When the oscillations remain constant, the car-trailer combination has reached the critical velocity. Above this speed threshold, a car-trailer combination is unstable, below said threshold it is stable, that means, possible oscillations die out. The magnitude of this critical speed depends on the geometry data, the tire rigidities, the weight and the distribution of weight of the towing vehicle and the trailer. Further, the critical speed is lower in a braked driving maneuver than at constant travel. In turn, it is higher during accelerated driving than at constant travel. Methods for stabilizing car-trailer combinations are known in various designs. DE 199 64 048 A1 discloses that upon the detection of a snaking motion, a yaw torque is automatically applied to the vehicle, which is basically in antiphase to the snaking motion. The snaking motion is detected by evaluation of the measured lateral acceleration, and the velocity and/or the steering angle of the vehicle are taken into consideration in order to distinguish a snaking motion from steering movements of the vehicle. The brake pressures shall be determined depending on the frequency, the phase of the snaking motion.

Further, the objective of DE 100 32 230 A1 is to determine the yaw motion of the vehicle and to detect the phase of the oscillation at any time by means of an oscillation analysis (Fourier transformation). This method, which manages without sensing the steering angle, provides to intervene into the left-hand or right-hand brake of the vehicle by means of a short, abrupt pulse in the correct phase, in order to damp the oscillation.

According to EP 0 765 787 B1, the amplitude of the lateral acceleration or the yaw angle velocity (yaw rate) is taken into consideration, which shall lie within a predefined frequency band and exceed a predefined threshold value, in order to introduce brake pressure into the brake devices of the wheels of the vehicle. In this arrangement, the condition that a steering motion quantity remains under a predetermined threshold shall be complied with.

Further, EP 0 989 049 A2 describes a car-trailer combination and a method changing the steering angle of the wheels of a vehicle axle of the tractor upon the occurrence of a difference value of the actual and nominal yaw motions of the towing vehicle in order to reduce the difference. It is preferred that the steering angle of all wheels of the steerable vehicle axle is changed by the same amount.

Generic DE 100 48 418 A1, on the other hand, again arranges for damping an analyzed oscillation by a periodically varying yaw torque, which is generated by reciprocal brake intervention of an ESP control on the vehicle. Corresponding to DE 100 32 230 A1, the Fourier transformation is used to calculate the amplitude of the yaw angle deviation and to activate the brake intervention when a threshold value is exceeded. As this occurs, the periodically varying yaw torque is generated with a phase delay in relation to the sensed vehicle oscillating motion, and it has a frequency, which corresponds to the oscillation frequency of the sensed periodic vehicle oscillation frequency. This is required because an ESP control comprises a brake intervention, which in the case of driving stabilization upon understeering or oversteering of the vehicle, however, does not intervene with a sufficient rate of sensitivity, on the one hand, and does not take place at the optimal point of time, on the other hand.

The known methods perform an oscillation analysis, for what purpose great calculating effort is needed. The great calculating effort needed increases the costs of operation considerably. Generic DE 100 48 418 A1 provides a yaw torque to be applied to the vehicle, which is reduced proportionally to the decreasing amplitude of the damped vehicle oscillation. Upon detection of the vehicle oscillation and application of the yaw torque, all methods are based on a periodic oscillation, which shall be damped by means of a yaw torque in antiphase and which stays periodical and decreases after damping. Surprisingly, however, it has shown that an application of a counteracting moment will not dampen the oscillation of the vehicle with trailer, but only changes the course of oscillation, i.e. the oscillation becomes disturbed and is destructed completely.

SUMMARY OF THE INVENTION

An object of the invention is to provide another method and another device for stabilizing a vehicle with a trailer, permitting a damping operation even if the vehicle oscillations are not periodic.

According to the invention, this object is achieved by the following steps:

Determining the yaw rate of the vehicle

Determining the reference yaw rate in a vehicle model

Producing a difference value from the yaw rate and the reference yaw rate

Weighting the difference value with a signal describing the steering dynamics

Producing a signal to determine the side of intervention and/or the wheel of intervention and/or the steering angle direction of the vehicle from the difference in change (rising or declining) of the weighted difference value Determining the amplitude of the weighted difference value and determining a counteracting moment depending on the amplitude of the weighted difference value.

In this respect, steering angle direction refers to the direction of the steering intervention.

Further, the object is achieved in that a generic device is configured in such a way that a first determination unit is provided, which determines a difference value from the yaw rate and the reference yaw rate, a filter unit is provided, which weights the difference value with a signal describing the steering dynamics, a second determination unit is provided, which determines the tendency to change of the weighted difference value, a third determination unit is provided, which determines the side of intervention and/or the wheel of intervention and/or the steering angle direction of the vehicle by way of the tendency to change, a fourth determination unit is provided, which determines the amplitude of the weighted difference value, and a control law is provided, which calculates a counteracting moment depending on the amplitude and the tendency to change of the weighted difference value.

An advantage of the method and the device (TSA=Trailer Stability Assist) involves that an oscillation analysis is unnecessary. For detection and plausibilisation of the oscillation it is sufficient to initiate the intervention in a manner as is e.g. described in WO2004/041612 A1. The intervention itself is controlled by way of the direction of change of deviation and is dimensioned by way of the oscillation amplitude. The actuating signal provided for the evaluation is produced from the measured yaw rate and a nominal yaw rate calculated in a vehicle model, and is weighted with a signal that describes the steering dynamics. Preferably, the derivative of the model yaw rate is used as a signal, which describes the steering dynamics. What is special with this signal is that it properly reflects the reaction of the vehicle to the steering dynamics.

For example, waving the steering wheel at low speeds causes insignificant oscillation of the vehicle, however, the same movement at high speeds causes a considerably higher degree of vehicle oscillation. The vehicle model is able to follow the insignificant oscillation and there is no deviation between the nominal yaw rate and the measured yaw rate, hence, a steering and/or braking intervention is not triggered. The significant oscillation, however, causes a major deviation so that TSA interventions become possible at the vehicle, without a trailer being coupled to the vehicle.

It is more or less likely that the same steering movement will trigger a TSA intervention at different speeds.

Therefore, it is preferred to use a signal, which takes into account both the steering movement and the speed. This signal is the derivative of the model yaw rate, since the signal represents the vehicle performance.

Alternatively, the steering dynamics and the vehicle speed are taken to weight the difference signal.

This type of detection and plausibilisation of the oscillation renders the controller very simple and saves resources. In addition, the oscillation is highly 'deformed' due to torque interventions, what greatly impairs an oscillation analysis and a determination of frequency and phase. The controller presented herein is independent of phases and is controlled with respect to time exclusively by the direction of change of deviation.

An advantage of the method and the device compared to the pure braking intervention is that the torque intervention is sufficient with the majority of snaking conditions in order to stabilize the car-trailer combination. Should the oscillation redevelop upon termination of the intervention, it is possible to carry out as many further interventions as desired. In particularly critical cases, the braking intervention can be added to provide a safety net. It is possible then that the torque intervention continues in operation in a superposed fashion. The advantage is that the braking intervention can take place in a less vigorous way and can be terminated earlier. Endangering of the subsequent traffic is reduced and comfort is enhanced.

BRIEF DESCRIPTION OF THE DRAWINGS

An embodiment of the invention is illustrated in the accompanying drawings and described in more detail in the following.

In the drawings.

DETAILED DESCRIPTION OF THE PREFERRED EMBODIMENTS

Figure 1:
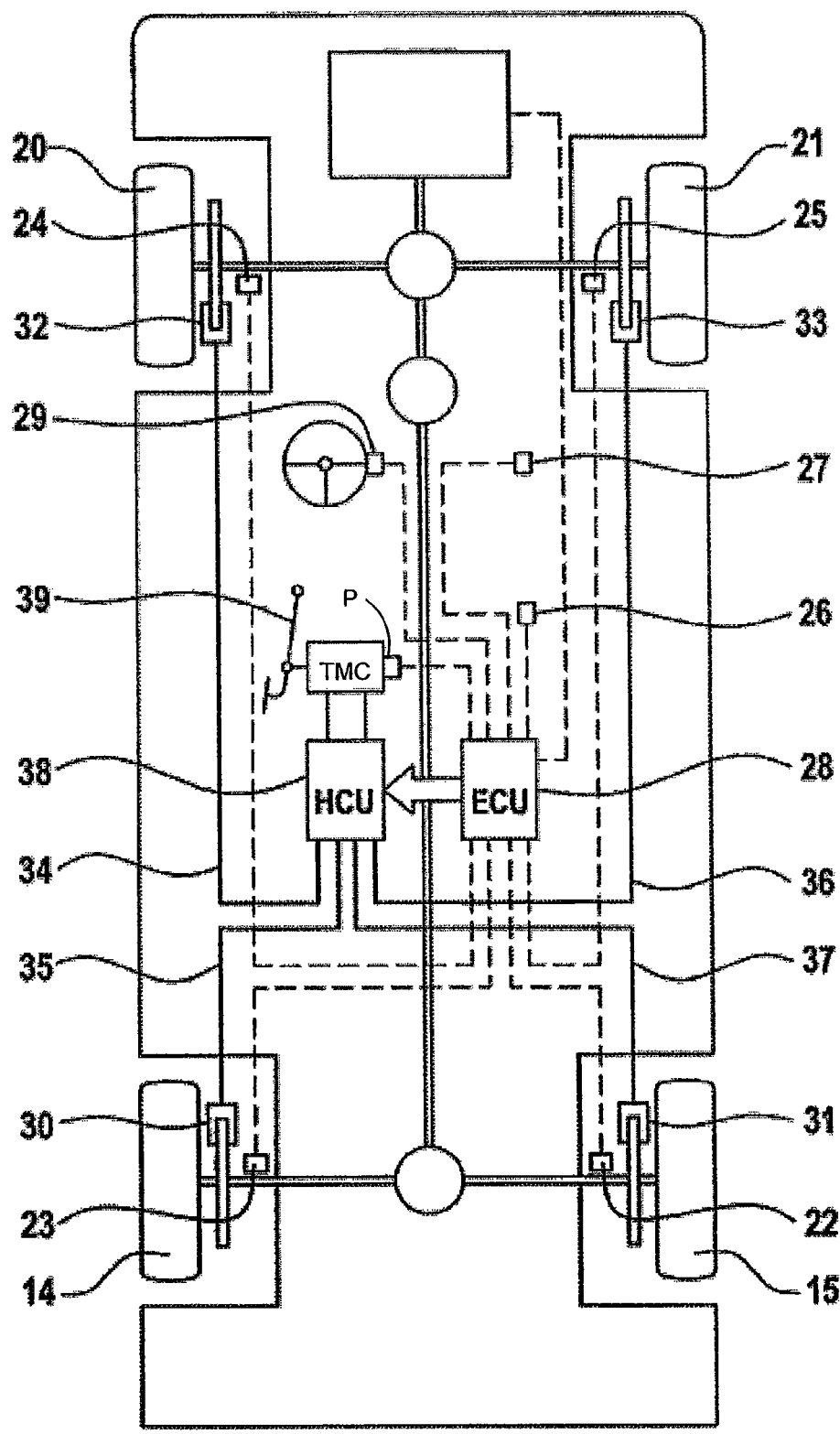
FIG. 1 is a vehicle with a trailer stability assist system.

FIG. 1 shows a schematic view of a vehicle with a trailer stability assist system TSA, brake system, sensor system, and communication provisions. The four wheels have been assigned reference numerals 14, 15, 20, 21. One wheel sensor 22 to 25 is provided at each of the wheels 14, 15, 20, 21. The signals are sent to a control unit 28 determining from the wheel rotational speeds a vehicle reference speed $v_{Ref}$ by way of predetermined criteria. Further, a yaw rate sensor 26, a lateral acceleration sensor 27, and a steering angle sensor 29 are connected to the control unit 28. Further, each wheel includes an individually actuatable wheel brake 30 to 33. The brakes are hydraulically operated and receive pressurized hydraulic fluid by way of hydraulic lines 34 to 37. The braking pressure is adjusted by way of a valve block 38, said valve block being actuated irrespective of the driver by way of electric signals produced in the electronic control unit 28. The driver can introduce braking pressure into the hydraulic lines by way of a master cylinder actuated by a brake pedal. Pressure sensors P used to sense the driver's braking request are provided in the master cylinder or the hydraulic lines, respectively. The control unit 28 connects to the engine control device by way of an interface (CAN).

It is feasible to provide a statement about the respective driving situation and to realize an activated or deactivated control situation by way of a determination of the entry and exit conditions using the trailer stability assist system TSA for vehicles with trailers, which comprises a brake system, sensor system, and communication provisions that includes the following pieces of equipment:

four wheel speed sensors pressure sensor P (braking pressure in master cylinder $p_{main}$)

lateral acceleration sensor (lateral acceleration signal $a_{actual}$, transverse inclination angle $\alpha$)

yaw rate sensor ($\dot{\Psi}$)

steering wheel angle sensor (steering angle 6, steering angle velocity $\dot{\delta}$)

individually controllable wheel brakes hydraulic unit (HCU)

electronic control unit (ECU).

This renders possible one main component of the method for stabilizing vehicles with trailers, i.e. the detection of driving situations, while the other main component, i.e. the interaction with the brake system, can also be realized with this stability assist system. Hereinbelow, the method is described by way of an intervention into the brake system of the vehicle, and alternatively the counteracting moment applied to the vehicle using the trailer stability assist system may also be put into practice by means of an active steering system, e.g. by using an overriding steering system, and intervention into the wheel brakes and intervention into the steering system can also take place simultaneously.

Figure 2:
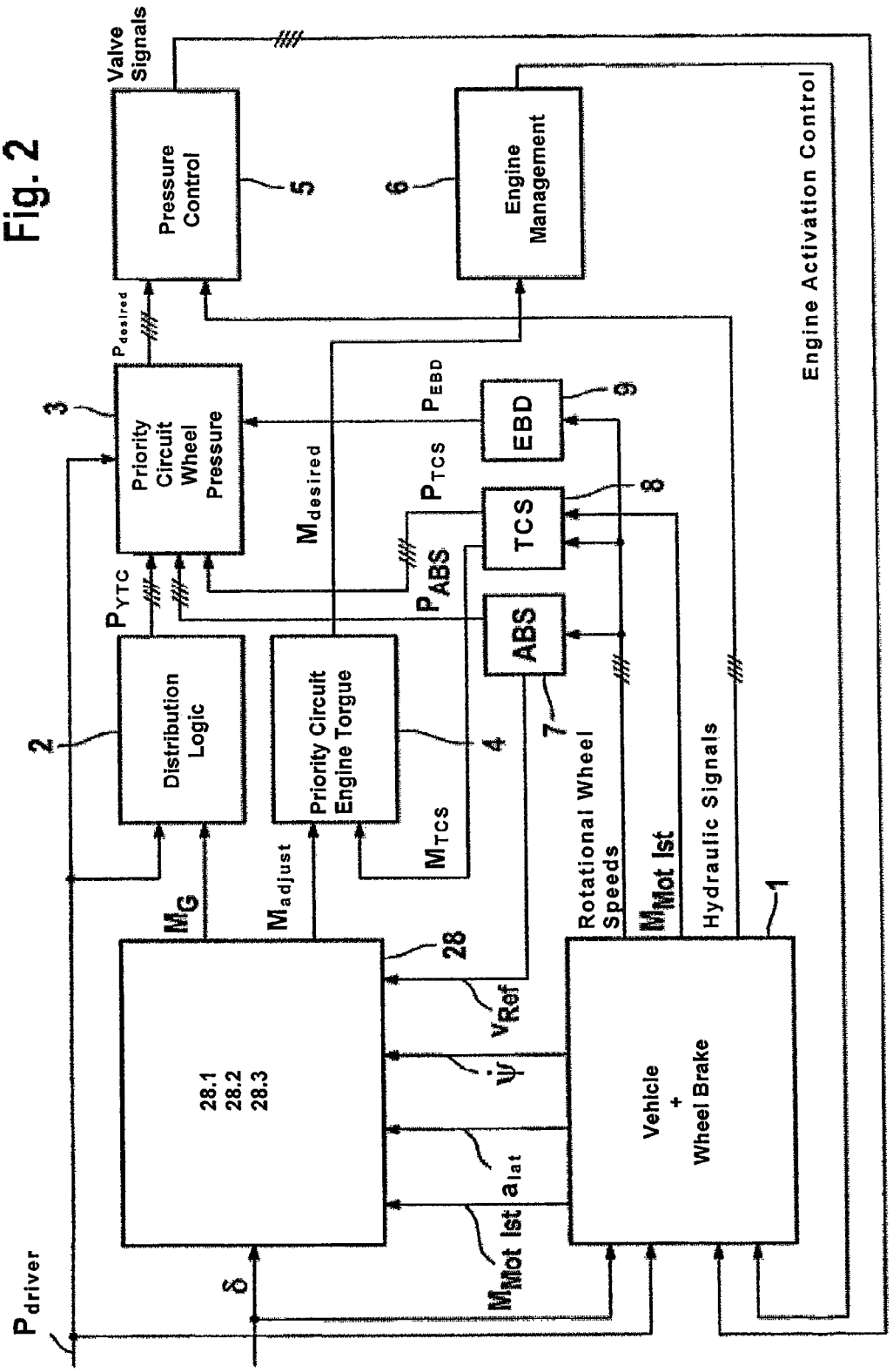
FIG. 2 is a wiring diagram relating to the overall structure of a system for driving stability control.

A general description of a vehicle controller including the trailer stability assist system TSA will now follow with reference to FIG. 2.

The variables given by the driver, namely, the driver brake pressure $p_{driver}$ or $p_{TMC}$ and the steering angle $\delta$ act on the vehicle 1. The variables resulting from this, namely, the motor moment $M_{motor}$ the lateral acceleration $a_{lat}$, the yaw rate $\dot{\Psi}_{meas}$, wheel speeds $v_{wheel}$ and hydraulic signals, such as wheel brake pressures $p_{TMC}$, are measured on the vehicle 1. To evaluate this data, the vehicle controller has several electronic controllers 7, 8, 9 and 28, which are associated with the anti-lock system ABS, the traction slip control system TCS, the electronic brake force distribution system EBD, and the yaw torque control system YTC with rollover prevention ARP. The electronic controllers for ABS 7, TCS 8, EBD 9, and YTC 28.3 as well as ARP 28.2 may correspond to the state of the art without modifications and, therefore, are not shown separately in the drawings.

The wheel speeds are sent to the controllers for the anti-lock system 7, the traction slip control system 8, and the electronic brake force distribution system 9. The controller 8 of the traction slip control system and the controller 28 additionally receive data on the prevailing engine torque, the motor moment $M_{motor}$. In addition, the control receives the data on the lateral acceleration $a_{lat}$, and the yaw rate $\dot{\Psi}$ of the vehicle from the sensors. Since a vehicle reference velocity $v_{ref}$, on the basis of which an excess brake slip of one of the wheels can be determined, is determined in the controller 7 of the ABS by way of the individual wheel speeds of the vehicle wheels, such a reference velocity need not be calculated in the controller 28, but is taken over from the ABS controller 7. Where the vehicle reference speed is calculated, whether it is adopted in the ABS controller, or whether a separate calculation is performed in the controller 28 for the vehicle stabilization makes only a slight difference for the process of stabilization. The same applies to the longitudinal acceleration $a_{long}$ of the vehicle. Accordingly, the value for this could also be determined in the ABS controller 7, and sent to the controller 28. This applies to the determination of the coefficient of friction $\mu$ of the road surface with restrictions only, because a more accurate coefficient of friction determination is desirable for the stabilization of a vehicle with trailer than is the case with the anti-lock system.

All electronic controllers of the vehicle controller, i.e., the controllers for TSA 28.1, ARP 28.2, YTC 28.3, ABS 7, TCS 8 and EBD 9 develop brake pressure set values $P_{TSA}$, $P_{ARP}$, $P_{YTC}$, $P_{ABS}$, $P_{TCS}$, $P_{EBD}$ for the individual wheels simultaneously and independently from one another based on their own control strategies.

The preset pressure values $P_{TSA}$ of the controller 28.1 for the individual wheel brake pressures are determined in the following way:

The controller 28.1 first calculates a counteracting moment $M_G$, which leads to stabilization of the driving condition for a snaking vehicle within a curve or in straight travel if it is generated by a corresponding brake actuation. This moment $M_G$ is sent in each case to a distribution logic unit 2, which could also be represented as part of the controller 28. In addition, the possible desire of the driver to decelerate the vehicle, which is recognized from the driver brake pressure $P_{Driver}$ (=$P_{TMC}$), is also sent to distribution logic unit 2. The distribution logic unit 2 calculates from the predetermined counteracting moment $M_G$ and from the desired driver brake pressure, counteracting moment control brake pressures $P_{YTC}$ for the wheel brakes, which may differ from each other very greatly for the individual wheels. These counteracting moment control brake pressures $P_{YTC}$ are sent to a priority circuit 3 for the wheel brake pressures for the purpose of function optimization along with the preset pressure values calculated by the other controllers 7, 8, 9, 28.2, 28.3 for ABS, TCS, EBD, ARP and YTC. Priority circuit 3 determines desired wheel pressures $p_{Desired}$ for optimal driving stability and optimal driving behavior, taking into account the driver's desire. These desired pressures may either correspond to the preset pressure values of one individual of the controllers, or represent a superimposition.

The procedure followed in the case of the counteracting moment is similar to the procedure with the wheel brake pressures. While ABS and EBD act only on the wheel brakes, intervention into the engine torque is also provided in the case of TSA, ARP, YTC and TCS. The preset values $M_{AdjustM}$ and $M_{TCS}$ calculated for the engine torque are again evaluated in a priority circuit 4 and superimposed to a desired torque. However, this desired torque $M_{Desired}$ may also just as well correspond only to the calculated preset value of one of the controllers.

Vehicle control by way of the brake and engine intervention can now be performed based on the calculated desired preset values for the wheel brake pressure $P_{Desired}$ and for the engine torque $M_{Desired}$. Hydraulic signals or values, which reflect the actual wheel brake pressure, are likewise sent to the pressure control unit 5 for this purpose. From this, the pressure control unit 5 generates valve signals, which are sent to the control valves of the individual wheel brakes in the vehicle 1. The engine management 6 controls the drive motor of the vehicle according to $M_{Desired}$ as a result of which a changed motor moment is again generated. This will then again lead to new input variables for the electronic controllers 7, 8, 9 and 28 and the driving stability system.

Figure 3:
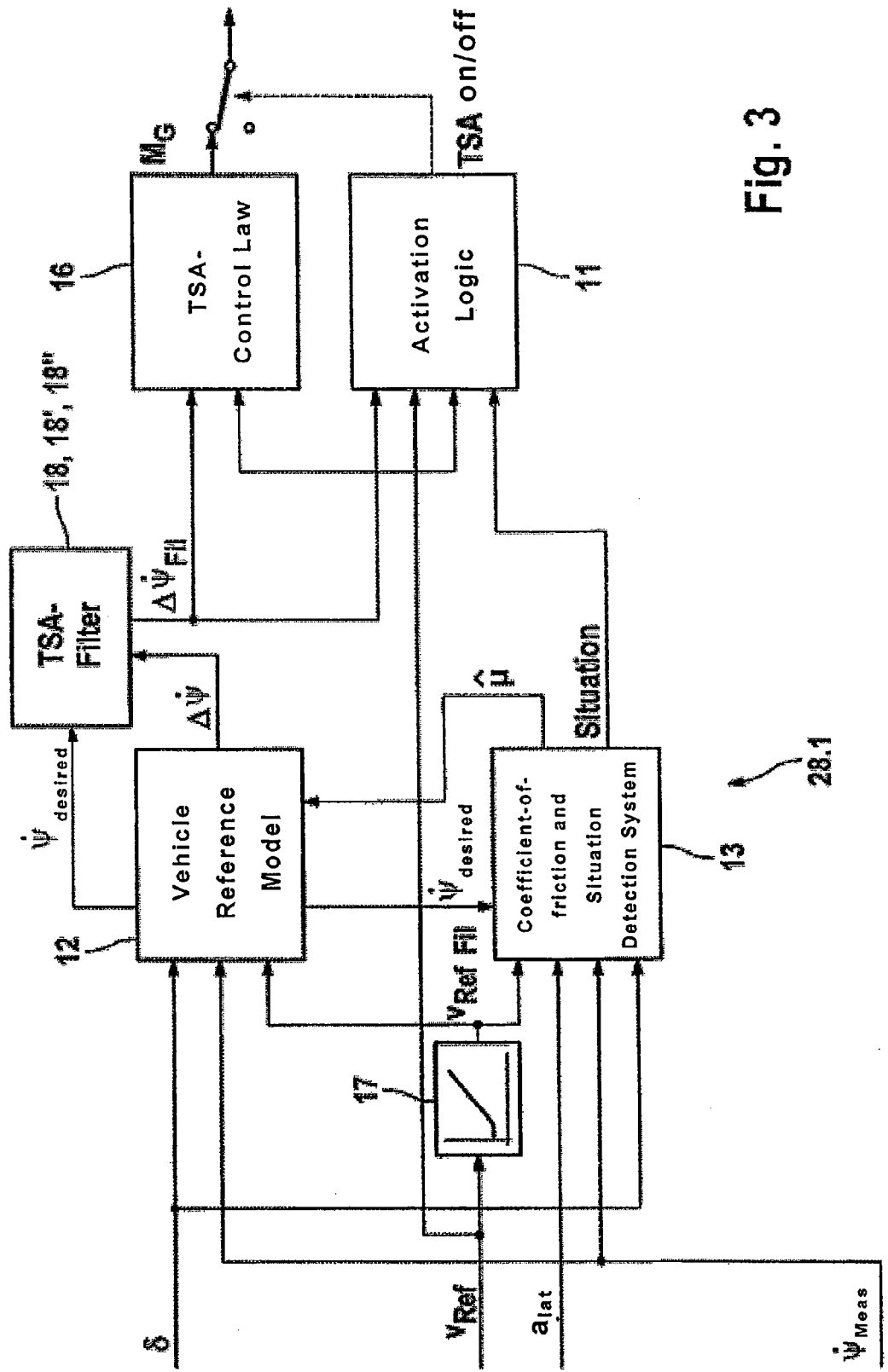
FIG. 3 is a wiring diagram relating to the structure of the counteracting moment controller.

The structure of the TSA (Trailer Stability Assist) controller 28.1 for stabilizing the vehicle 1 with trailer is schematically shown in FIG. 3.

FIG. 3 shows in a block diagram how the counteracting moment $M_G$ for the distribution logic unit 2 is determined by means of the TSA controller 28.1 within the driving stability controller 28. The steering angle $\delta$, the vehicle reference velocity $V_{Ref}$ from the ABS controller 7, the measured lateral acceleration $a_{lat}$, and the measured yaw rate $\dot{\Psi}_{Meas}$ are entered as input variables for this purpose. The vehicle reference velocity $V_{Ref}$ passes through a filter 17, which sets a constant value above zero at low velocities, so that the denominator of a fraction will not become equal to zero during further calculations. The unfiltered value of $v_{Ref}$ is sent to an activation logic unit 11, which recognizes the standstill of the vehicle.

This direct determination of the vehicle reference velocity $V_{Ref}$ by the activation logic unit 11 may also be omitted if standstill of the vehicle is assumed when the filtered vehicle reference velocity $V_{RefFii}$ assumes its constant minimum value.

A vehicle reference model 12, which calculates a preset value for a change in the yaw rate $\Delta\dot{\Psi}$ on the basis of the steering angle $\delta$, the filtered vehicle reference velocity $V_{RefFii}$ as well as the measured yaw rate $\dot{\Psi}_{Meas}$, is stored in the driving stability controller 28, which preset value the TSA controller 28.1 will utilize.

All electronic controllers of the driving stability control 28, i.e. the controllers for TSA 28.1, ARP 28.2, YTC 28.3, operate based on the deviation of the yaw rate $\Delta\dot{\Psi}$ calculated in the vehicle model 12. However, this preset value that founds on the desired yaw rate $\dot{\Psi}_{desired}$ may also be determined in each controller 28.1, 28.2, 28.3 in parallel and independently of one from the other based on their own control strategies.

Various vehicle reference models may be used for TSA counteracting moment control. The calculation is most favorable on the basis of the dynamic single-track model, i.e., the front wheels and the rear wheels are integrated pair wise in this model into one wheel each, which is located on the longitudinal axis of the vehicle. The calculations become considerably more complicated if they are based on a two-track model. However, since lateral displacements of the center of gravity (rolling motions) can also be taken into account in the two-track model, the results are more accurate.

The system equations $$\dot{\beta} = c_{11}\frac{\beta}{v} - \dot{\Psi} + c_{12}\frac{\dot{\Psi}}{v^2} + c_{13}\frac{\delta}{v}$$

$$\ddot{\Psi} = c_{21}\beta + c_{22}\frac{\dot{\Psi}}{v} + c_{23}\delta$$

can be written in the phase space diagram for the preferred single-track model.

The sideslip angle $\beta$ and the yaw rate $\dot{\Psi}$ represent the phase variables of the system. The input variable acting on the vehicle is the steering angle $\delta$, as a result of which the vehicle receives the yaw rate $\dot{\psi} = \int \ddot{\psi}\, dt$ as an output variable after integration of $\ddot{\Psi}$. The model coefficients $c_{ij}$ are formed as follows:

$$c_{11} = -\frac{c_h + c_v}{m} \quad c_{12} = \frac{c_h l_h - c_v l_v}{m} \quad c_{13} = \frac{c_v}{m}$$

$$c_{21} = \frac{c_h l_h - c_v l_v}{\Theta} \quad c_{22} = -\frac{c_h l_h^2 + c_v l_v^2}{\Theta} \quad c_{23} = -\frac{c_v l_v}{\Theta}$$

F 1.3

$c_h$ and $c_v$ are the resulting rigidities from the elasticity of the tire, wheel suspension and steering on the rear axle and the front axle, respectively. $l_h$ and $l_v$ are the distances of the rear axle and the front axle, respectively, from the center of gravity of the vehicle. $\Theta$ relates to the moment of inertia of the vehicle, i.e., the moment of inertia of the vehicle around its vertical axis.

Longitudinal forces and displacements of the center of gravity are not taken into account in this model. This approximation is also valid only for low angular velocities. Consequently, the accuracy of the model decreases with decreasing curve radii and increasing velocities. In order to ensure an optimal mode of operation of the vehicle reference model 12 also in this range, the linear dynamic vehicle model 12 as described above may also be equipped with a stationary circular course model, switch over to which model is made in the range of low speeds of the vehicle 1.

To keep the preset values within the physically possible range, the coefficient of friction $\mu$ of the road surface, which is calculated as an estimated value $\hat{\mu}$ in a coefficient-of-friction and situation detection system 13, is also needed for these calculations. If the coefficient of friction determined within the limits of the anti-lock control has sufficient accuracy, this coefficient of friction may be used as well, or the coefficient of friction calculated in the controller 28.1 may be taken over in the ABS controller 7.

The coefficient-of-friction and situation detection system 13 uses for its calculations the filtered reference velocity $v_{RefFil}$, the measurement vehicle lateral acceleration $a_{lat}$, the measured yaw rate $\dot{\Psi}_{Meas}$ and the steering angle $\delta$.

The situation detection system 13 distinguishes different cases, such as straight travel, travel in curves, reverse travel and standstill of the vehicle. Standstill of the vehicle is assumed when the filtered vehicle reference velocity $v_{RefFil}$ assumes its constant minimum value. Instead of the unfiltered vehicle reference velocity, this information may also be sent to the situation detection system 13 to recognize standstill of the vehicle. The fact that at a given steering angle $\delta$, the orientation of the measurement yaw rate $\dot{\Psi}$ is opposite that during forward travel is utilized to recognize reverse travel. The measured yaw rate $\dot{\Psi}_{Meas}$ is compared for this purpose with the desired yaw rate $\dot{\Psi}_{desired}$ preset by the vehicle reference model 12. If the signs are always opposite, and this also applies to the time derivatives of the two curves, the vehicle is traveling in reverse, because $\dot{\Psi}_{desired}$ is always calculated for forward travel, since the usual speed sensors do not detect information on the direction of rotation of the wheels. If, however, wheel speed sensors are used which sense the direction of rotation, this signal may also be sent to the situation detection system 13 for the detection of reverse travel.

A program 16 for putting the yaw torque control law into practice uses the filtered deviation $\Delta\dot{\psi}_{Fil}$ for the yaw rate, which is the filtered difference of the measured yaw rate $\dot{\Psi}_{Meas}$ and the desired yaw rate $\dot{\Psi}_{desired}$ calculated on the basis of the vehicle reference model 12. The difference value $\Delta\dot{\psi}$ produced from the measured yaw rate $\dot{\psi}_{meas}$ and the calculated desired yaw rate $\dot{\psi}_{desired}$ passes through a low-pass filter 18', so that no extreme peaks will occur. In the TSA filter 18, the difference value $\Delta\dot{\Psi}$ is modified towards smaller values in addition in the event of quick changes in the desired yaw rate $\dot{\psi}_{desired}$. Due to the weighting by means of a factor that depends on the desired yaw rate $\dot{\psi}_{desired}$, spurious detections are ruled out in the event of fast steering motions where the vehicle cannot follow the vehicle model. Alternatively, the weighting operation can take place with a signal indicating the steering angle acceleration or the steering angle velocity. The low-pass filter 18' and the filter 18" that is responsive to the desired yaw rate are components of the TSA filter 18.

The program 16 operates permanently to keep ready current control variables all of the time. However, whether these controlling torques are transmitted to the distribution logic unit 2 shown in FIG. 1 depends on the activation logic unit 11.

The activation logic 11 not only receives the value of the unfiltered vehicle reference speed $v_{Ref}$ but also the filtered deviation $\Delta\dot{\psi}_m$ of the desired yaw rate $\dot{\psi}_{desired}$ from the measured yaw rate $\dot{\psi}_{meas}$ and an information from the situation detection system 13, if reverse travel prevails.

When the vehicle is reversing, the transmission of $M_G$ is interrupted. The same applies when vehicle standstill is detected or when the evaluation of the filtered yaw rate change $\Delta\dot{\psi}_{Fil}$ leads to a variable that demands a control operation. The variable is reached when the amount of the amplitudes of the half waves of $\Delta\dot{\psi}_{Fil}$ exceeds a determined value several times in succession. The logic circuit for calculating the motor adjusting torque $M_{AdjustM}$ is not shown.

In addition to the vehicle model 12, also the coefficient-of-friction and situation detection system 13 and the control law as well as the activation logic 11 can be designed as components of a conventional, however, modified yaw rate controller YTC or as a separate component of a TSA controller for stabilizing vehicles with trailers. The distribution logic 2, the priority circuit 3, and the pressure control 5 are preferably part of the modified yaw rate controller 28.3 and put the counteracting moment $M_G$ determined in the TSA controller 28.1 into practice. Its principal strategy for stabilizing a vehicle in the unbraked case consists in the targeted deceleration of individual wheels by active pressure buildup in the corresponding wheel brake cylinder. A stabilizing torque is hereby applied to the vehicle structure by reduction of lateral force and simultaneous increase in longitudinal force or braking force. In contrast to the unbraked case, in the case of simultaneous driver's braking or active, driver-independent braking for the introduction of a stabilizing counteracting moment, one has to based on the existence of pressure and force distribution on the wheels, which develops in the wheel brake cylinders due to the pilot pressure or, as the case may be, due to the level of pressure introduced by the ABS (anti-lock system).

For better explanation, an intervention into the wheel brake cylinders and the determination of the pressure requirement $P_{desired}$ will be described in the following sections.

Calculation of the Controller Output Variable $M_G$

Figure 4:
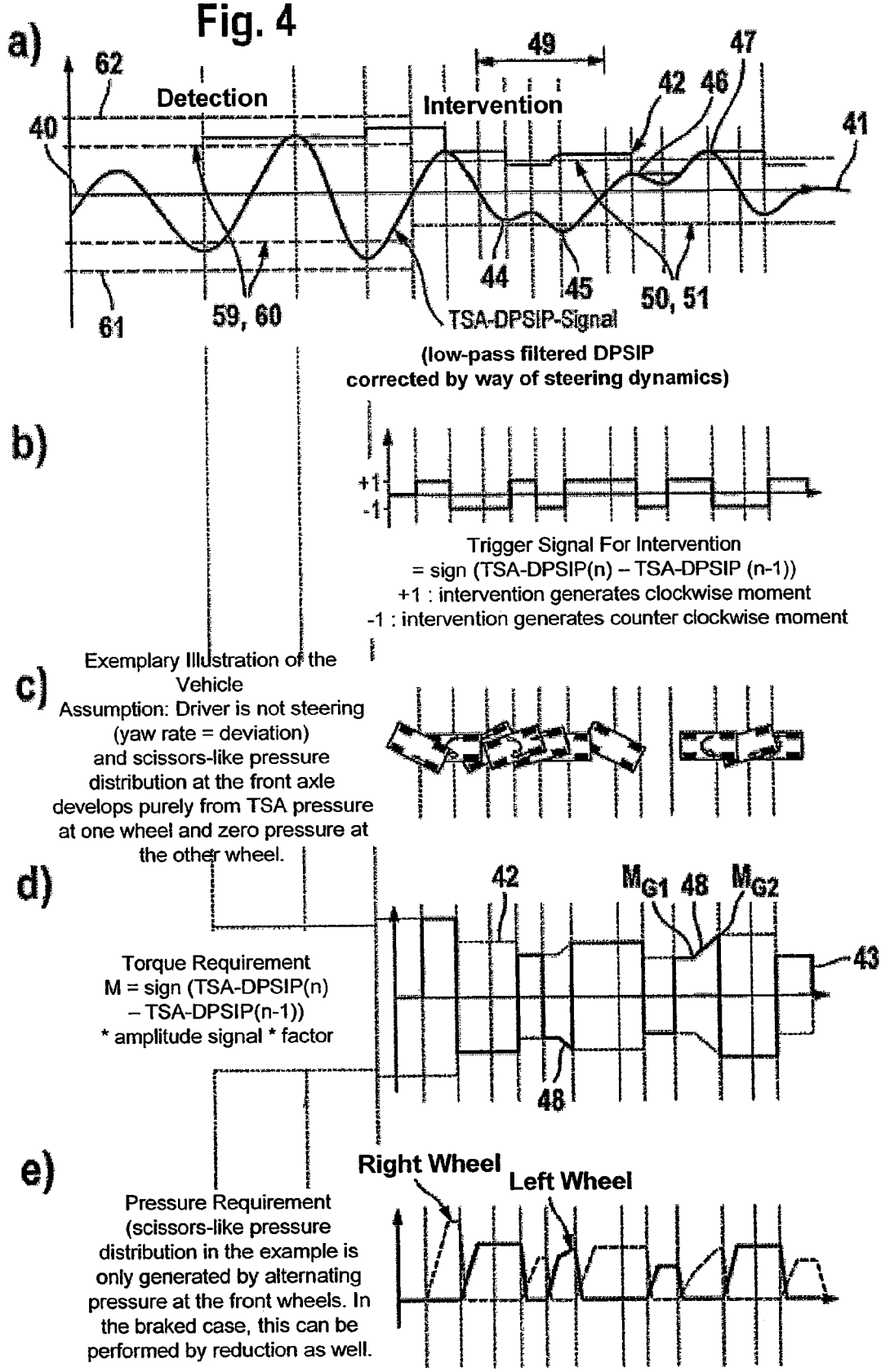
FIG. 4 is a schematic view of the filtered deviation and the pressure requirement determined therefrom.

The basic elements of the control circuit can be seen in FIGS. 2 and 3. The total controller output variable $M_G$ of the TSA controller 28.1 is defined after recognition of the control case according to the fashion illustrated in FIG. 4:

The difference signal 41, which is low-pass filtered and corrected by way of the steering dynamics (desired yaw rate), from the measured yaw rate $\dot{\psi}_{meas}$ and the desired yaw rate $\dot{\psi}_{desired}$ calculated by way of the vehicle reference model 12 is checked in terms of the sign, which is achieved from the relation $\{TSA-\Delta\dot{\psi}_{Fil}(n)\}-\{TSA-\Delta\dot{\psi}_{Fil}(n-1)\}$. Based on this relation, the tendency is produced from the filtered difference value $\Delta\dot{\psi}_{Fil}$ by determining the deviation of the currently filtered value $\Delta\dot{\psi}_{Fil}(n)$ from the value $\Delta\dot{\psi}_{Fil}(n-1)$ determined in the previous loop. A loop lasts between 5 to 30 msec. As can be seen from FIG. 4a in connection with 4b, the sign adopts a positive value, i.e. +1, with a rising signal $\Delta\dot{\psi}_{Fil}$ and a negative value, i.e. −1, with a declining signal $\Delta\dot{\psi}_{Fil}$. As this occurs, the sign is irrespective of whether the difference value $\Delta\dot{\psi}_{Fil}$ of the signal 41 filtered from the measured yaw rate and the model-based desired yaw rate is above or below the zero crossing 40.

The side of intervention of the vehicle is determined by means of the trigger signals +1 and −1. In this respect, +1 implies a clockwise counteracting moment and −1 implies a counter clockwise counteracting moment.

The output variable $M_G$ of the TSA controller 28 rises proportionally to the instability of the vehicle and, thus, likewise to the necessary counteracting moment, which is required to achieve the desired stabilization of the vehicle. This counteracting moment is applied to the vehicle structure by one-sided pressure increase in the actuators (wheel brakes). In detail, the brake torques applied to the wheels cause a buildup of brake force in the longitudinal direction of the vehicle and a reduction of lateral force in the transverse direction, generating the desired counteracting moment when the intervention wheels are suitably selected. Monitoring the wheel slip is alternatively possible. Once the wheel slip exceeds certain slip thresholds, the magnitudes of which are favorably chosen depending on the wheel dynamics, the demanded brake torque is reduced or totally removed, with the result that the counteracting moment is generated exclusively by buildup of brake force in the longitudinal direction. In this arrangement, the slip threshold is chosen to be low at high dynamics, and high at low dynamics. When the vehicle is snaking, the front wheel is chosen which is respectively defined by way of the trigger signal +1 or −1. FIG. 4c shows this schematically with regard to a simplified example. This example is based on the assumption that the driver is not steering so that the measured yaw rate basically corresponds to the filtered deviation. The counteracting moment $M_G$ is produced using a distribution of pressure like a scissors at the front axle in wheel brakes 32 or 33. Under the condition that pilot pressure $P_{ref}$ is not introduced into the wheel brakes, the brake pressure in one of the wheel brakes 32 or 33 corresponds to the TSA brake pressure, while the brake pressure is 0 bar in the respectively other wheel brake 32 or 33. Noticeably, the change from the left wheel brake 32 to the right wheel brake 33 is controlled by way of the trigger signal +1 or −1.

The controller output variable $M_G$ is calculated depending on the amount of the amplitude of the filtered difference value $\Delta\dot{\psi}_{Fil}$. To this end, the maximum instantaneous value 42 is determined from the filtered signal $\Delta\dot{\psi}_{Fil}$ 41 at each half wave and retained until the next maximum instantaneous value 42. The maximum instantaneous values 42 of each half wave are defined using the relation $\Delta\dot{\psi}_{Fil}(n)-\Delta\dot{\psi}_{Fil}(n-1)$. The initial value $\Delta\dot{\psi}_{Fil}$ determined at the onset of control offers with each control step (loop) of the TSA controller 28.1 the possibility of updating in the course of the detection. If $\Delta\dot{\psi}_{Fil}$ is positive and $\Delta\dot{\psi}_{Fil}(n)-\Delta\dot{\psi}_{Fil}(n-1)$ is negative, the amplitude is stored. When the tendency becomes positive again thereafter, the value of the stored amplitude will be increased when $\Delta\dot{\psi}_{Fil}$ exceeds the previously stored amplitude. The amplitude is then overwritten or updated in the further course when $\Delta\dot{\psi}_{Fil}$ becomes negative and the tendency reverses, i.e. is positive. In this case, too, the amplitude is further adapted when the tendency reverses and $|\Delta\dot{\psi}_{Fil}|$ becomes still higher than the stored value.

Hence, the calculation of the counteracting moment is as follows:

$$M_G=\text{sign}\{TSA-\Delta\dot{\psi}_{Fil}(n)\}-\{TSA-\Delta\dot{\psi}_{Fil}(n-1)\}*A\Delta\dot{\psi}_{Fil}*\text{factor}$$

with:

$M_G$: counteracting moment
$\{TSA-\Delta\dot{\psi}_{Fil}(n)\}-\{TSA-\Delta\dot{\psi}_{Fil}(n-1)\}$: tendency to change of the filtered yaw rate deviation
$A\Delta\dot{\psi}_{Fil}$: amplitude of the filtered yaw rate deviation
factor: freely selectable factor for adapting the intervention to the vehicle/brake/etc.

The factor takes into account the brake design, the vehicle mass, the vehicle size, the track width, the mass distribution, and like variables.

FIG. 4d shows the variation of the torque requirement 43 in proportion to the variation of the amount of the amplitude 42 of the filtered deviation $\Delta\dot{\psi}_{Fil}$ from the measured yaw rate $\dot{\psi}_{meas}$ and the calculated desired yaw rate $\dot{\psi}_{desired}$. The intervention is composed of several pressure pulses, the magnitude of which is defined by the value or height of the amplitude 42. The counteracting moment $M_G$ is maintained on the value of the amplitude until the trigger signal +1, −1 changes the sign or the control is terminated. If the signal of the filtered deviation $\Delta\dot{\psi}_{Fil}$ contains several top waves 44,45 or 46,47, respectively, in a half wave, an amplitude 44 or 45 is determined in the way described above, the instantaneous value of which would lead to a counteracting moment $M_{G1}$ that would not correspond to the maximum value of the amplitude. However, due to the updating operation, the instantaneous value is adapted until the maximum value of the amplitude 45 because no zero crossing 40 is detected. The transition 48 from the counteracting moment $M_{G1}$ to the counteracting moment $M_{G2}$ develops.

The magnitude of the necessary pressure increase $\Delta p_{auf}$ is defined for the front axle of the vehicle from the relation $$\Delta p_{auf,v}=|M_G|,$$

that means, the controller output variable $M_G$ is physically already a pressure, apart from the sign. Should it be desired to put the controller output variable $M_G$ into practice at the rear axle, also in consideration of the wheel brakes 30, 31, or should it be desired to superpose a brake pressure at all wheel brakes on the counteracting moment $M_G$, the conditional equation for the rear axle is as follows:

$$\Delta p_{auf,h} = K_{Br}|M_G|,$$

The gradient of the conversion of a brake cylinder pressure into a brake force is not identical for the front axle and the rear axle. Factor $K_{Br}$, which is calculated in the following manner, reflects this factor:

$$K_{Br} = \frac{A_{K,v}}{A_{K,h}} \frac{r_{w,v}}{r_{w,h}} \frac{C_v^*}{C_h^*}$$

In this relation:
$A_K$—brake piston surface
$r_w$—effective brake radius
$C^*$—brake constant.

It was assumed in the equation for the factor $K_{Br}$ that both the coefficient of friction of the pair of brake lining/brake surface and the tire radii of the front and rear axles are equal. The pressure increase for the wheel brakes 32, 33 of the front axle calculated in the equation in the unbraked case is zero, i.e. for the pilot pressure, equal to the pressure requirement $p_{auf}$ that is to be predefined as an absolute value. For the braked case, however, pilot pressure is already existing in all wheel brakes, which must be taken into account for the pressure increase of the TSA (Trailer Stability Assist) system. Therefore, the pressure requirement is defined in the following manner:

$$p_{auf} = p_{ref} + \Delta p_{auf}$$

The pressure $p_{ref}$ is a reference pressure, based on which the pressure increase is performed. This pressure is equal to the actual pressure of the wheel undergoing pressure buildup at the beginning of the control (value is saved), and a compensation of external influence quantities is active during the control process. In this respect, pressure increases are detected at the opposite wheel of the same axle, which were caused e.g. due to increase of the driver's pilot pressure or increase of the ABS control level (due to an abrupt change in coefficient of friction or similar conditions). The unbraked case is contained in the equation for the braked case for $P_{ref} = 0$.

FIG. 4e shows the pressure requirement $p_{auf}$ by way of the pressures in the wheel brakes 32, 33 at the front wheels 20, 21 that vary depending on the sign of the gradient $\{TSA-\Delta\dot{\psi}_{Fil}(n)\}-\{TSA-\Delta\dot{\psi}_{Fil}(n-1)\}$.

If the pressure requirement $P_{auf}$ and the resulting pressure in the wheel brake cylinder is continuously increased, the corresponding wheel will initially reach the slip range of the maximum coefficient of friction in the vehicle longitudinal direction. Until this point, brake force is built up in the longitudinal direction, on the one hand, and cornering force is reduced, on the other hand. Thereafter, a continued pressure increase does not bring about any essential increase of the brake force, however, the cornering force is further reduced, that means a further increase of the pressure is suitable also in this range and is therefore performed as well. However, this effect has its limits with regard to great slips (greater than 80%), where only an insignificant decrease of lateral force can still be detected. The pressure requirement is restricted to a defined level for this reason and also in order to prevent comfort-reducing wheel lock.

A slip controller defines the above level. In consideration of the actual slip measured at the wheel, the controller is constantly monitoring in the background a nominal pressure $p_{slip}$ in the wheel cylinder, which would lead to a nominal slip of 50%. If this pressure $p_{slip}$ is lower than the pressure requirement $p_{auf}$ determined in the equation for the braked case, then $p_{slip}$ becomes the new pressure requirement $p_{auf}$. Due to the control quality of the slip controller, preferably a slip band of roughly 30-70% will develop in this range of operation. If the pressure requirement $p_{auf}$ at the wheel brake defined by the sign of the gradient cannot be put into practice in this case, pressure is reduced at the opposite wheel of the front axle.

If the objective is to prevent every reduction of lateral force, it is possible to adjust lower values of the nominal slip.

In a superposition with a driver's braking operation or braking by way of the TSA controller 28 initiated by the system, or any other assist function, in addition to or as a substitute, pressure at the diagonally opposite wheel can be reduced as an alternative to the brake pressure that is built up in excess of the driver pressure or the system pressure built up by the assist system. As this occurs, the above-mentioned relation between $M_G$ and the front-axle pressure or, respectively, $M_G$ and the rear-axle pressure can be used in order to convert pressure buildup components to the rear axle and put them into practice as pressure reduction at the diagonal rear wheel. Alternatively, pressure buildup at the rear axle can be transferred as a reduction to the front axle.

The intervention is terminated when sufficient damping of the vehicle with trailer has been achieved. Sufficient damping of the snaking motion of the vehicle is given when an amplitude of the filtered deviation $\Delta\dot{\psi}_{Fil}$ falls under the exit control thresholds 50, 51. In this arrangement, separate entry thresholds 59, 60 and exit thresholds 50, 51 are provided for the amplitudes of the filtered deviation $\Delta\dot{\psi}_{Fil}$. The distance between the entry threshold and the exit threshold may typically amount to 0.5°/s. The result of this hysteresis is that the intervention lasts until sufficient damping has been achieved. This safeguards that there is a defined intervention and that the TSA controller 28.1 is prevented from being constantly activated and deactivated again.

It may occur at the end of a TSA intervention that the oscillation was destroyed, yet the signal $\Delta\dot{\psi}_{Fil}$ continues oscillating to a slight extent and no zero crossing of the signal causes termination of the TSA intervention. Admittedly, various plausibility monitoring arrangements will cause termination of the control after a certain time in such a case. However, further high-frequency torque intervention may take place in the meantime, which can be vigorous in addition, depending on the height of the last learnt amplitude. This performance is very uncomfortable because the car-trailer combination is already stabilized subjectively. Monitoring of the intervention frequency is provided to prevent this condition. If the reciprocal interventions follow in very short succession and the $\Delta\dot{\psi}_{Fil}$ signal is already below the exit threshold, the TSA controller 28.1 stays active, however, the reciprocal interventions are suppressed and, therefore, will not have further effects.

Figure 6:
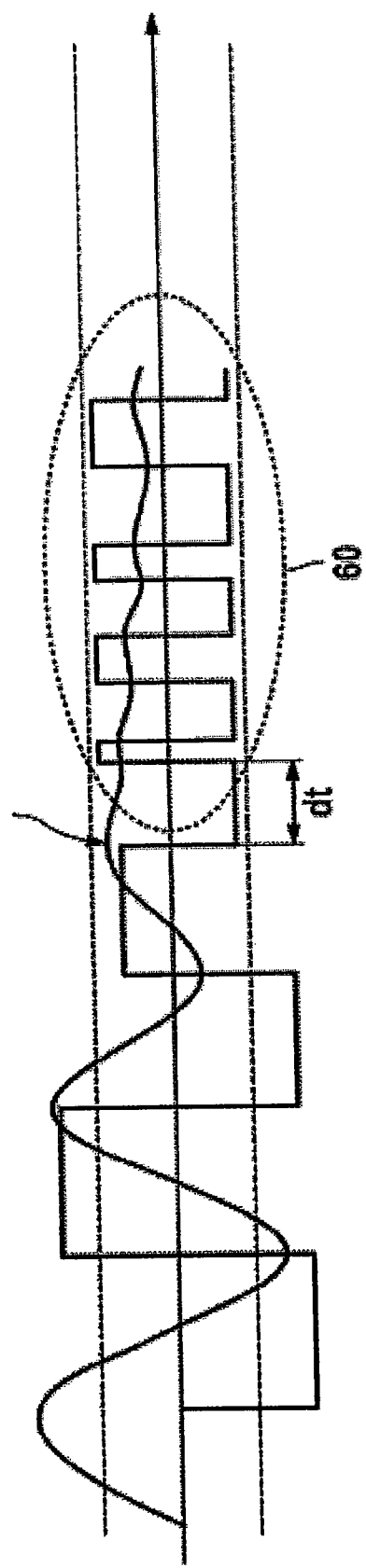
FIG. 6 shows the end of a TSA intervention with an oscillating difference value.

FIG. 6 shows the end of a TSA intervention. dt represents the time of an intervention. One can see the interventions in quick successions in the dotted area 60 in the illustrated case. They would be suppressed following the first detected short intervention until TSA is terminated or the exit threshold (broken lines) is exceeded again.

Figure 5:
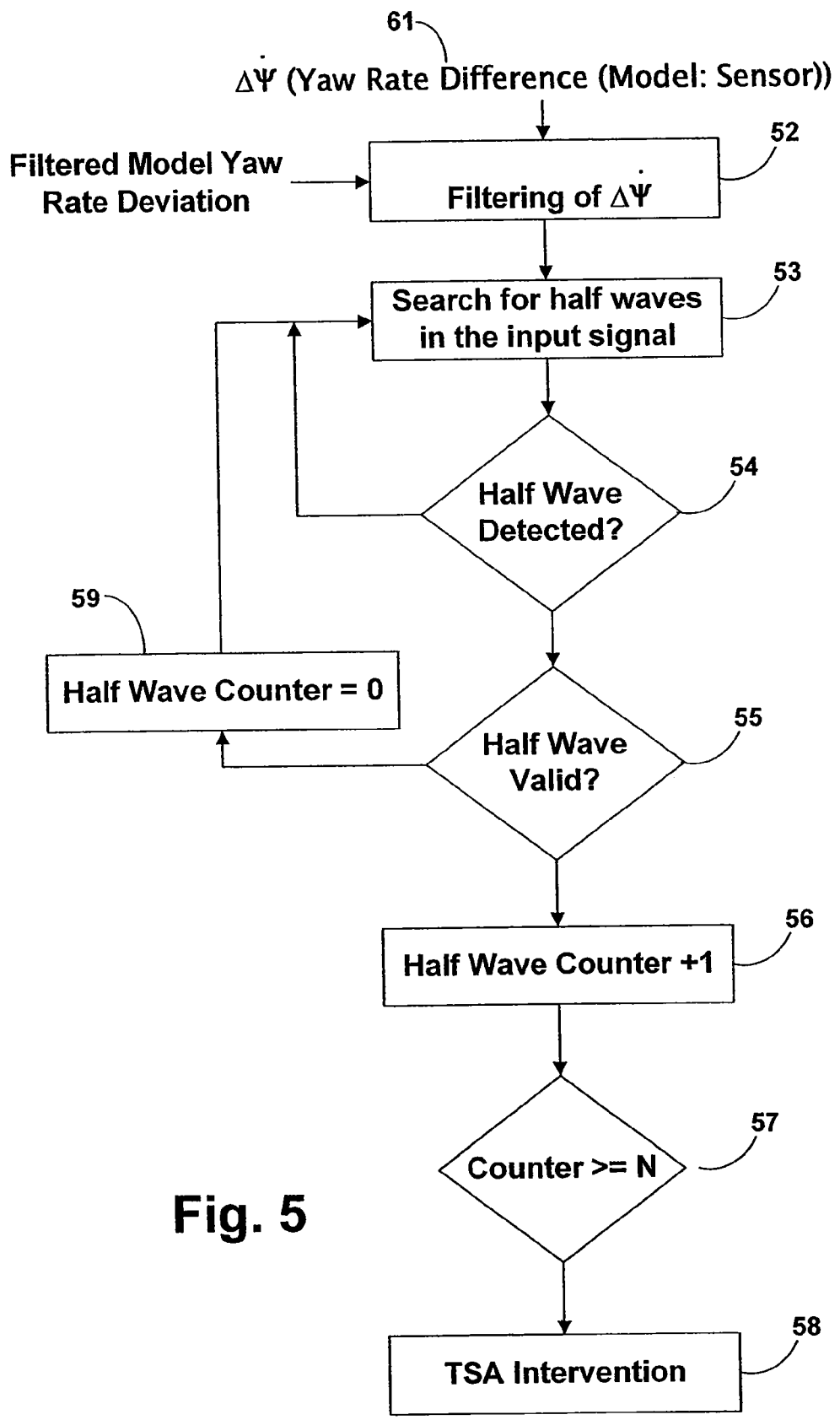
FIG. 5 is a schematic view relating to the determination of the entry into control.

A particularly favorable embodiment of the invention arranges for a two-stage condition of the detection of snaking of the car-trailer combination. FIG. 5 shows a simplified view of the logical processes upon the detection of the control entry: Starting from the yaw rate difference 52 ($\Delta\dot{\psi}$) between the model-based desired yaw rate and the measured yaw rate as determined in the vehicle model 12, the difference value 52 is filtered in TSA filter 18 in step 53. This means that the difference value 52 undergoes low-pass filtering so that extreme peaks will not appear. In addition, it is weighted or corrected in the filter 18 by way of a signal representative of the steering dynamics, preferably the desired yaw rate. Step 53 comprises the search for half waves in the input signal of the filtered deviation $\Delta\dot{\psi}_{Fil}$, which are analyzed by way of two zero crossings, one maximum, a minimum amplitude and a defined initial gradient. A poll is made in lozenge 54 whether the half wave was detected. If this is not the case, switch-back to step 53 is made, and the search for half waves is continued. If the half wave was detected by way of the previous criteria, it is checked in terms of its validity in lozenge 55. To this end, the half wave is checked with regard to the following conditions:

The maximum of the half wave must exceed a defined threshold value that preferably depends on the vehicle reference speed $v_{Ref}$.

The distance of the zero crossings (half wave length) must be in the significant frequency range 0.5 to 1.5 hertz.

A band (typically +/−0.3-0.4°/s) around the zero point must be left after a defined time. Only defined zero crossings are thus taken into consideration.

Starting with the second wave found:

The half wave length must roughly correspond to the previous one.

The average value of the lateral acceleration must not be higher than a defined value.

The lateral acceleration must have the same sign at the time of the maximum of the half wave.

The lateral acceleration must have a half wave of roughly the same duration.

The desired yaw rate must have the same sign at the time of the maximum of the half wave.

The desired yaw rate must be lower than the vehicle yaw rate by a certain amount.

If all of these conditions are satisfied, the half wave is valid, and the half wave counter in step 56 is incremented. In the case of a significant amplitude decrease (current amplitude is only X % of the previous amplitude), the counter will not be incremented but maintains its value, what can lead to a later entry into the control. If not all of the conditions are satisfied, the half wave counter is reset to zero in step 59. It is found out in lozenge 57 whether N half waves are detected. If the number N of the valid half waves exceeds a detection threshold value, the condition for detecting a snaking vehicle with trailer is satisfied. This will trigger torque control of the vehicle in step 58.

The two-stage condition is reached when further higher entry thresholds 61, 62 in the way described hereinabove are provided, allowing deceleration of the vehicle with trailer through all four wheel brakes 30, 31, 32, 33 independently of the driver, i.e. by actuating the motor-pump assembly or the booster of the brake system. The intervention that decelerates the vehicle with the trailer is based on the condition that the maximum of the half wave must exceed a defined threshold value 61, 62 that is higher compared to the entry thresholds 59, 60. If the conditions prevail, the intervention into the wheel brakes will cause a superposed torque and deceleration intervention. This intervention serves as a net for especially critical situations. In addition to the counteracting moment $M_G$, the controller 28.1 calculates preset pressure values $P_{ref}$ for all wheels 15, 14, 20, 21 of the vehicle with trailer for this situation, which are determined depending on the intensity of the snaking motion. Signals, which should be taken into account, are also the amplitudes of the filtered difference signal from the measured yaw rate $\dot{\psi}_{Meas}$ and the desired yaw rate $\dot{\psi}_{desired}$ calculated by way of the vehicle reference model 12.

According to another alternative, the two-stage condition can be reached if the amplitude tendency is reviewed rather than that the entry thresholds have a two-stage design. When the oscillation shows a defined degree of damping, the vehicle speed is not yet or only scarcely in excess of the critical speed. Torque intervention is sufficient in this case. If the degree of damping is exceeded, it is likely that the critical driving speed is exceeded at a considerable extent. An additional counter counts these especially critical half waves and starts the braking intervention in addition to the torque intervention after the number N2 is reached. The degree of damping is found out in that the height of the amplitudes from half wave to half wave is assessed. A particularly critical situation prevails when the height rises by a defined value. Torque and deceleration interventions are started. If this is not the case, torque intervention is sufficient.

Alternatively, an evaluation of lateral force signals weighted with the steering dynamics signal, e.g. the steering angle velocity, and/or lateral acceleration, and/or the frequencies of at least one lateral force (yaw rate and/or lateral acceleration), and/or the vehicle speed can be taken into account to determine the deceleration intervention.

Apart from the superposed entry into torque and deceleration control, the case is envisaged that the amplitudes exceed the entry threshold 59, 60 and that likewise the higher entry threshold 61, 62 is exceeded at a later time. If a sufficient number of half waves are found above the threshold 59, 60, torque intervention will be carried out as described hereinabove. If a sufficient number of half waves are found later likewise above the threshold 61, 62, deceleration takes place, while torque intervention stays active (comparable with the case with superposed braking, e.g. with a driver's braking operation, as described hereinabove). As it is assumed that the deceleration will bring the vehicle with trailer back into a speed range in which the car-trailer combination is no longer unstable (below the critical speed), the hysteresis meant for torque intervention is not maintained. Rather, the threshold 50, 51 is used now in order to fix the time of stop of both interventions. The deceleration intervention is stopped when a half wave amplitude falls below the threshold 50, 51. This fact will ensure that the termination of the deceleration also entails a termination of the torque intervention.

The TSA intervention can cause stabilization so effectively that the car-trailer combination calms down even if it is still above the critical speed. The effect is thereby achieved that a second activation follows briefly after the termination of the first control because the car-trailer combination is re-oscillating. In order to re-enter into the control in this case at short notice, a defined mode is started for a certain time (roughly 3 s) after an intervention, which initiates a new start at a number of half waves inferior to the normally demanded number. If e.g. otherwise three valid half waves are required, TSA in this mode starts already after one valid half wave detected. In the ideal case, the reactivation will thus take place so shortly after the first intervention that the driver feels one coherent intervention.

A state detection is used to determine from the amplitudes of the filtered difference signal $\Delta\dot{\psi}_{Fil}$ how critical the driving condition is. Derived from the driving condition, low deceleration is demanded in a rather uncritical condition and great deceleration in a rather critical condition.

In this arrangement, the difference signal $\Delta\dot{\psi}_{Fil}$ can be evaluated in terms of time in addition to the actual condition. Thus, a higher rate of deceleration must be demanded in the case of a currently uncritical oscillation that is imminent to increase according to tendency, while in contrast thereto, a lower rate of or possibly no deceleration should be demanded with a currently critical yet declining oscillation. More particularly, an early reduction of the deceleration is advantageous because the final speed of the car-trailer combination is not too low, what otherwise could jeopardize the car-trailer combination and the traffic in the rear, especially on highways.

A signal, which represents the actual deceleration of the vehicle with trailer, is reviewed to determine the brake pressure variation to be provided in the wheel brakes 30 to 33. A deceleration signal of this type can be calculated from the signals of the ABS wheel sensors 22 to 25 fitted to the vehicle. The filtered wheel decelerations can be determined from the wheel speeds measured by the wheel sensors, and they can be set, in the capacity of actual variables, in relation to nominal decelerations desired by way of introducing the brake pressures.

This detecting operation takes into account the exclusion of defective wheel sensors, the exclusion of dynamic wheels (wheel deceleration must not be too high or too low, it must range between $+k_1 g$ and $-k_2 g$), the exclusion of wheels with very much slip, and the like).

A signal of this type allows exactly controlling the deceleration requirement. It is especially favorable that external forces and influences (e.g. side wind, load condition of the car-trailer combination, type of trailer) as well as inclined roadways (downhill/uphill) can be controlled by adaptation of the actual deceleration and, thus, the desired deceleration is always adjusted.

The slips of the wheels are monitored in addition to the decelerations, and at the first sign of an imminent locked condition of a wheel of one axle, the pressure requirements at that axle are reduced or disabled and will not be re-increased or enabled until the imminent locked condition no longer exists. To this end, the amounts of slip are evaluated during ABS control by storing the wheel speed at the beginning of wheel slip and the wheel speed at the end of wheel slip as well as the time between the two wheel speeds. The pressure requirement is reduced by calculating the gradients according to the relation $((v2-v1)/dt$ and averaging the gradients for all wheels 14, 15, 20, 21 using the thus calculated deceleration. Reduction of the cornering forces is thereby prevented, what means that the vehicle is not destabilized and remains steerable. It is especially favorable that the reduction of the pressure requirement takes place always at both wheels of an axle in order not to develop additional yaw torques which could destabilize the vehicle.

In another particularly favorable embodiment, the deceleration requirement is not withdrawn abruptly but in a graded manner at the end of control. This achieves a smooth reduction of the vehicle-trailer deceleration, what enhances the comfort and diminishes the risk of making the driver insecure.

The criteria permit a control in cornering maneuvers and even during steering movements of the driver.

The invention claimed is:

1. A method for stabilizing a vehicle including a trailer drawn by the vehicle comprising the steps of:
    measuring, by a yaw rate sensor, a yaw rate of the vehicle as the vehicle is in motion;
    determining, by a processor, a reference yaw rate from a predetermined vehicle model;
    producing, by the processor, a difference value from the measured yaw rate and the reference yaw rate;
    weighting, by the processor, the difference value with a factor determined based on a derivative of the reference yaw rate to define a weighted difference value,
    wherein the factor decreases the difference value as the derivative of the reference yaw rate increases;
    producing, by the processor, a second signal to determine a side of intervention, a wheel of intervention, a steering angle direction of the vehicle, or any combination thereof, from a tendency to change of the weighted difference value; and
    applying, by an actuator controlled by the processor, a counteracting moment to the vehicle depending on an amplitude and the tendency to change of the weighted difference value.

2. The method as claimed in claim 1,
    wherein the tendency of the second signal to change in amplitude from positive to negative or from negative to positive is investigated, and the side of intervention at the vehicle is changed when the signal changes in amplitude.

3. The method as claimed in claim 1,
    wherein the counteracting moment is applied to the vehicle according to the following relation:

$$M_G = \text{sign}\{TSA-\Delta\dot{\psi}_{Fil}(n)\}-\{TSA-\Delta\dot{\psi}_{Fil}(n-1)\}*A\Delta\dot{\psi}_{Fil}*\text{factor}$$

wherein:
    $M_G$=counteracting moment;
    $\{TSA-\Delta\dot{\psi}_{Fil}(n)\}-\{TSA-\Delta\dot{\psi}_{Fil}(n-1)\}$=tendency to change of the filtered yaw rate deviation;
    $A\Delta\dot{\psi}_{Fil}$=amplitude of the filtered yaw rate deviation; and
    factor=freely selectable factor for adapting the intervention at the vehicle or brake.

4. The method of claim 1,
    wherein the signal describing the steering dynamics is at least one of a derivative of the reference yaw rate, a steering angle acceleration or a steering angle velocity.

5. A method for stabilizing a vehicle including a trailer drawn by the vehicle,
    comprising the steps of:
    measuring, by a yaw rate sensor, a yaw rate of the vehicle as the vehicle is in motion;
    measuring, by a steering angle sensor, a steering angle velocity and a steering angle acceleration of the vehicle as the vehicle is in motion;
    determining, by a processor, a reference yaw rate from a predetermined vehicle model;
    producing, by the processor, a difference value from the measured yaw rate and the reference yaw rate;
    weighting, by the processor, the difference value with a factor determined based on the steering angle velocity or the steering angle acceleration to define a weighted difference value,
    wherein the factor decreases the difference value as the measured steering angle velocity or the steering angle acceleration increases;
    producing, by the processor, a signal to determine a side of intervention, a wheel of intervention, a steering angle direction of the vehicle or any combination thereof, from a tendency to change of the weighted difference value; and
    applying, by an actuator controlled by the processor, a counteracting moment and a deceleration to the vehicle depending on an amplitude and the tendency to change of the weighted difference value.

6. The method of claim 5,
wherein the signal describing the steering dynamics is at least one of a derivative of the reference yaw rate, a steering angle acceleration or a steering angle velocity.

7. A device for stabilizing a vehicle including a trailer drawn by the vehicle, comprising:
a vehicle controller including:
- a yaw rate sensor, which measures a yaw rate signal corresponding to a yaw motion of the vehicle;
- a predetermined vehicle model, which generates a reference yaw rate signal corresponding to a desired yaw movement of the vehicle;
- a lateral acceleration sensor, which generates a lateral acceleration signal corresponding to a lateral acceleration of the vehicle;
- a steering angle sensor, which generates a steering angle signal corresponding to a steering wheel angle;
- a plurality of wheel speed sensors used to generate wheel speed signals, the wheel speed signals corresponding to speeds of the plurality of wheels;
a first determination unit which determines a difference value from the measured yaw rate and the reference yaw rate;
a filter unit which weights the difference value with a factor determined based on a derivative of the reference yaw rate signal to define a weighted difference value,
wherein the factor decreases the difference value as the derivative of the reference yaw rate signal increases;
a second determination unit which determines a tendency to change of the weighted difference value;
a third determination unit which determines a side of intervention, a wheel of intervention, a steering angle direction of the vehicle, or any combination thereof, by way of the tendency to change;
a fourth determination unit which determines an amplitude of the weighted difference value; and
a control unit which calculates a counteracting moment depending on the amplitude and the tendency to change of the weighted difference value.

8. The device as claimed in claim 7,
wherein the counteracting moment is calculated according to the following relation:
$$M_G = \text{sign}\{TSA - \Delta\dot{\psi}_{Fil}(n)\} - \{TSA - \Delta\dot{\psi}_{Fil}(n-1)\} * A\Delta\dot{\psi}_{Fil} * \text{factor}$$
wherein:
$M_G$ = counteracting moment;
$\{TSA - \Delta\dot{\psi}_{Fil}(n)\} - \{TSA - \Delta\dot{\psi}_{Fil}(n-1)\}$ = tendency to change of the filtered yaw rate deviation;
$A\Delta\dot{\psi}_{Fil}$ = amplitude of the filtered yaw rate deviation; and
factor = freely selectable factor for adapting the intervention at the vehicle or brake.

9. The device of claim 7,
wherein the signal describing the steering dynamics is at least one of a derivative of the reference yaw rate, a steering angle acceleration or a steering angle velocity.

* * * * *